(12) United States Patent
Abdul-Khalek

(10) Patent No.: US 6,964,158 B2
(45) Date of Patent: Nov. 15, 2005

(54) METHOD AND APPARATUS FOR PARTICLE-FREE EXHAUST GAS RECIRCULATION FOR INTERNAL COMBUSTION ENGINES

(75) Inventor: Imad Said Abdul-Khalek, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/361,278

(22) Filed: Feb. 10, 2003

(65) Prior Publication Data

US 2004/0154284 A1   Aug. 12, 2004

(51) Int. Cl.[7] ............................................. F02M 25/06
(52) U.S. Cl. ........................ 60/278; 60/274; 60/279; 60/297
(58) Field of Search ................... 60/278, 279, 297, 60/311, 274

(56) References Cited

U.S. PATENT DOCUMENTS

| | | |
|---|---|---|
| 4,316,360 A | 2/1982 | Liu et al. |
| 4,649,703 A | 3/1987 | Dettling et al. |
| 4,864,821 A | 9/1989 | Hoch |
| 5,085,049 A | 2/1992 | Rim et al. |
| 5,207,734 A * | 5/1993 | Day et al. ..................... 60/278 |
| 5,253,476 A | 10/1993 | Levendis et al. |
| 5,426,936 A | 6/1995 | Levendis et al. |
| 5,517,976 A | 5/1996 | Bachle et al. |
| 5,592,925 A * | 1/1997 | Machida et al. ........ 123/568.11 |
| 6,173,567 B1 | 1/2001 | Poola et al. |
| 6,295,815 B1 | 10/2001 | Bechele et al. |
| 6,301,888 B1 | 10/2001 | Gray, Jr. |
| 2001/0017123 A1 | 8/2001 | Raab et al. |
| 2001/0027782 A1 | 10/2001 | Bianchi et al. |
| 2001/0027784 A1 | 10/2001 | Schmid et al. |
| 2001/0042372 A1 | 11/2001 | Khair |
| 2001/0045090 A1 | 11/2001 | Gray, Jr. |

* cited by examiner

Primary Examiner—Thomas Denion
Assistant Examiner—Diem Tran
(74) Attorney, Agent, or Firm—Gunn & Lee, P.C.; Ted D. Lee

(57) ABSTRACT

An exhaust gas recirculation system for reducing $NO_x$ emissions from engines, comprising an exhaust recovery means for passing an exhaust gas stream in molecular contact with a clean air engine intake stream. A molecular diffusion means separates particulate matter in the exhaust stream by molecular diffusion by exposing the two streams to each other and allowing molecular transfer to occur between the two streams, until near gas phase equilibrium is achieved. Little or no particle transfer takes place between the two streams due to their slow diffusion relative to gas phase species so that some of the oxygen present in the intake air stream is replace with with $CO_2$ and $H_2O$ molecules from the exhaust.

7 Claims, 1 Drawing Sheet

METHOD AND APPARATUS FOR PARTICLE-FREE EXHAUST GAS RECIRCULATION FOR INTERNAL COMBUSTION ENGINES

CROSS-REFERENCE TO RELATED APPLICATIONS

None.

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The invention relates generally to exhaust gas recovery in internal combustion engines and particularly to exhaust gas recovery in diesel engines and to separation of particulate matter in exhaust gas before mixing with intake gas.

Exhaust gas recirculation (EGR) is an approach that is used for reducing $NO_x$ emissions from engines. A portion of the exhaust gas is typically recirculated to the intake air system of an engine to enrich the intake air with inert constituents such as $CO_2$ and $H_2O$ molecules, reducing the level of oxygen entering the combustion process. This process results in a decrease in the peak and average temperatures inside the combustion chamber of an engine, and thus reduces $NO_x$, emissions. While EGR application is a common practice in spark ignited, gasoline engines, its use in heavy-duty diesel is limited. Recently, with more stringent $NO_x$ emission regulation, there has been a tremendous interest in using an EGR strategy to reduce $NO_x$ emissions from diesel engines.

However, due to the presence of soot in the exhaust products, intake air with EGR may contain particulate matter. Particle-laden EGR leads to intake air system fouling, contributes to lube oil contamination, degrades turbocharger and aftercooler performance, and leads to premature piston ring and liner failure. Thus removing particles from EGR is desirable.

2. Description of the Related Art

U.S. Pat. No. 4,316,360 issued to Lin et al. discloses a method and apparatus for controlling particulate emissions from a combustion apparatus, as a diesel engine. Diesel engine exhaust particles are electrically charged during the formation of the particles in the engine combustion chamber. A particle collector is used to collect the electrically charged particles on collecting structures connected to a high voltage power supply and ground. The collecting structures of the particle collector can be a plurality of parallel metal plates, spaced cylindrical rods, or concentrically located cylindrical members. A fibrous matrix can be located adjacent the particle collecting structure to collect the charged particles as they move through the matrix. In one embodiment, the collected particles separate from the collecting structures and return to the engine intake. In another embodiment, a removable collecting cartridge has electrically conductive plates for collecting the charged particles. The entire cartridge is removed for cleaning or replacement. The hot exhaust gas from the engine can be used to oxidize the collected particles. The collected particles that are not oxidized can be separated from the collecting structures and re-entrained into the gas. The re-entrained particles are larger than the particles formed in the combustion apparatus. The large particles can be removed by a downstream particle collection device or mixed with fuel for the engine.

U.S. Pat. No. 4,649,703 issued to Dettling et al. discloses an apparatus for removing solid particles from internal combustion engine exhaust gases is proposed, in which the flow of exhaust gas travels at a high speed of more than 2.5 m/sec through an elongated tube (4), in which a corona discharge takes place from a coaxial spray disk/electrode arrangement toward the wall of the tube. Inside the tube, the soot particles are agglomerated to form larger particles, which are not deposited on the walls because of the high flow speed, which then carries them to a centrifugal precipitator, leading away from which are a tube carrying scrubbed exhaust gas and an outlet having a small quantity of exhaust gas highly enriched with soot. This soot-enriched flow of exhaust gas can advantageously be recirculated to the intake side of the associated engine for afterburning.

U.S. Pat. No. 4,864,821 issued to Hoch discloses an improved method for removing solid particulate matter from the exhaust of a diesel engine, having the steps of passing the engine's exhaust flow through at least a part of filter means to trap solid particulate matter contained initially in the exhaust, thereby to remove said matter from said exhaust flow, periodically interrupting the exhaust flow through at least said part of the filter means, passing, during said interruption, at least one backflush fluid pulse through at least said part of the filter means thereby to dislodge from the filter means, and entrain, said solid particulate matter, and transporting said dislodged solid particulate matter to the intake of said engine so that said matter can be combusted in the engine, wherein the improvement comprises purge means advantageously positioned so as to allow the discharge of noncombustible particulate matter from the engine before it accumulates to a harmful level.

U.S. Pat. No. 5,085,049 issued to Rim, et al discloses a diesel engine exhaust filtration system and method which removes both diesel particulate matter (DPM) and unburned hydrocarbons (UHC) from the exhaust gases. Two filters in parallel are used, each alternating operation as the other regenerates. Each filter is preferred to be constructed in a conventional manner and operates at between 100 to 300 degrees Centigrade. A microprocessor controlled valve system regulates which filter is active and which is regenerating and/or inactive. DPM accumulates at the active filter, with UHC condensing on the DPM. When the active filter becomes clogged, the microprocessor switches it to inactive status, and switches the other filter to active status. Low temperature regeneration is initiated by the microprocessor in which DPM and UHC burn slowly across the entire filter. A recirculation conduit provides for the gases produced by the regeneration to be directed to the air intake of the diesel engine. Any remaining UHC or DPM will be subsequently burned in the combustion chambers of the diesel engine or taken out by the other active filter. When regeneration has completed, the inactive filter will await being switched by the microprocessor to active status when the other filter has become sufficiently clogged that it is time for it to be regenerated.

U.S. Pat. No. 5,253,476 issued to Levendis et al discloses A simple, low cost and reliable total particulate (soot, polynuclear aromatic and aliphatic hydrocarbons and ash) control system is disclosed that separates the particulate burning process from the body of a particulate filter and that needs very little compressed air to regenerate. The system can retrofit any existing diesel-powered equipment. The particulate control system includes a stationary ceramic monolith trap that is regenerated by one or more pulses of high-pressure and low-velocity air that move in the opposite direction of the engine exhaust flow through the trap. The particulate control system in a single trap embodiment conducts the engine exhaust to the atmosphere during regeneration periods, and in a dual trap embodiment, conducts the engine exhaust through two traps that are operated alternatively such that while one is filtering the exhaust the other is being regenerated, and vice versa.

U.S. Pat. No. 5,426,936 issued to Levendis et al discloses a diesel engine exhaust gas recirculation system for control of $NO_x$ emissions is disclosed in hi h total particulate (soot, condensed polynuclear aromatic and aliphatic hydrocarbons, and ash) control system is employed to filter the exhaust gas prior to reintroduction to the diesel engine. By cleaning the recirculated exhaust gas of substantially all particulates, wear on the engine due to particulate abrasion is minimized, and $NO_x$ and particulate emissions are reduced. The particulate control system includes a high efficiency ceramic monolith trap that is periodically regenerated by one or more pulses of high-pressure air that move in the opposite direction of the engine exhaust flow through the trap. In one embodiment, a portion of the filtered diesel exhaust is recirculated to the engine. In a further embodiment, the particulate control system filters a portion of the diesel exhaust in the recirculation flow path. The system can retrofit any existing diesel-powered equipment.

U.S. Pat. No. 5,517,976 issued to Bächle et al discloses the production of harmful substances during the operation of multi-cylinder diesel engines is reduced by separating the cylinders of the engine into two groups in combination with an exhaust gas return from one group to the other. The first group includes a plurality of the cylinders (2 to 6). The second group includes at least one cylinder (7), which is separated from the first group as far as combustion is concerned. A first fresh air suction intake (9) supplies fresh air to the group of first cylinders (2 to 6). An exhaust gas return device (24) feeds either directly or indirectly exhaust gas from the at least one second cylinder (7) through the first fresh air suction intake (9) to the group of first cylinders (2 to 6). A second fresh air suction intake (10) supplies fresh air to the second group of cylinders (7). The second fresh air suction intake (10) may also receive some exhaust gas which is then combusted by an additional fuel supply in the second fresh air suction intake (10).

U.S. Pat. No. 5,592,925 issued to Machida et al discloses an exhaust gas recirculation device for an internal combustion engine has a filter for trapping particulates in a recirculation gas, which is arranged in a recirculation gas route, and a device for generating a reverse air flow in which a pure gas flow for the reverse air flow passing through said filter in a reverse direction with respect to a recirculation gas flowing direction in the filter is generated. In the exhaust gas circulation device, the trapped gases are discharged out of the filter by the reverse air flow and are not returned into the internal combustion engine due to an engine exhaust pressure.

U.S. Pat. No. 6,173,567 B1 issued to Poola et al discloses a combustion air management and emission control system injects supplemental air directly into combustion chambers of a diesel engine in order to reduce total particulates in exhaust gases being emitted from the engine. A portion of intake air flowing toward an intake manifold of the engine is diverted to a compressor so that controlled quantities of pressurized supplemental air can be injected directly into each of the combustion chambers while the piston within the combustion chamber is in its expansion and/or exhaust strokes. At least a portion of the diverted intake air can be directed through a selectively permeable membrane device so that oxygen-enriched air and nitrogen-enriched air are produced. At least a portion of the oxygen-enriched air can be supplied to the compressor so that the supplemental air being injected into the combustion chambers will contain a desired, elevated amount of oxygen. In order to simultaneously reduce $NO_x$ from the exhaust gases of the engine, the nitrogen-enriched air can be mixed with intake air being supplied to the intake of the engine or can be introduced into a plasma device to generate monatomic nitrogen that is injected in the exhaust gases to react with $NO_x$ in the exhaust gases. Additionally, an exhaust gas recirculation system can be provided to recirculate a portion of the exhaust gases into the intake of the engine, fuel injection timing can be retarded to delay the beginning of combustion in the combustion chambers or rate shaping of the fuel delivery can be used.

U.S. Pat. No. 6,295,815 B1 issued to Bechele, et al discloses in an internal combustion engine with exhaust gas re-circulation including a fresh air supply duct extending from the charger of a turbocharger to the engine, an exhaust pipe extending from the engine to the turbine of the turbocharger for driving the turbocharger, and an exhaust gas re-circulation pipe extending from the exhaust pipe to the intake duct, the exhaust gas re-circulation pipe includes a flap valve having a pivotally supported flap which, in an open position of the flap valve, is disposed in a plane parallel to the direction of the exhaust gas flow through the flap valve for minimizing the flow resistance in the exhaust gas re-circulation pipe.

U.S. Pat. No. 6,301,888 B1 issued to Gray, Jr. discloses a diesel-cycle engine with an exhaust gas recirculation system includes a plurality of cylinders with fuel feed for each of the cylinders and an intake manifold for distributing intake air to each of the cylinders for combustion of the fuel charges therein with generation of exhaust gas. The exhaust gas is discharged to ambient atmosphere through an exhaust line with a gas turbine therein. The gas turbine drives an intake compressor which serves to compress the intake air. An engine controller controls a valve regulating the amount of exhaust gas recirculation responsive to sensed concentration of an exhaust gas component. In another embodiment, an engine controller controls a valve regulating the amount of exhaust gas recirculation, responsive to sensed demand for torque and control of fuel injection quantity is responsive to sensed concentration of an exhaust gas component. An exhaust gas recirculation line recirculates a portion of the collected exhaust gas to the combustion chambers through an exhaust gas cooler which serves to cool the gas and separate out a condensate and particulate matter. A return line leading from the exhaust gas cooler to the exhaust line serves to discharge the separated condensate and particulate matter through the exhaust line to the ambient atmosphere.

U.S. Pat. No. 2001/0017123 A1 issued to Raab, et al discloses a method for generating a homogeneous mixture for auto-ignition internal combustion engines and for controlling the combustion process, the internal combustion engine having an injection system and at least one cylinder/piston unit connected to an intake device, includes the steps of:

a. exhaust-gas recirculation of hot exhaust gas from a previous combustion cycle into the combustion space or into the intake device or exhaust-gas retention of this gas in the combustion space or in the intake device;

b. injection of fuel by the injection system into the retained or recirculated hot exhaust gas in order to generate a homogeneous fuel/air mixture; and c. cooling of the homogenized fuel/air mixture by expansion cooling or by isentropic compression in the respective cylinder/piston unit and/or by expansion cooling or by external cooling of a fuel/air mixture homogenized in at least one further cylinder/piston unit and recirculation of the cooled fuel/air mixture into the intake device.

U.S. Pat. No. 2001/0027782 A1 issued to Bianchi et al discloses an induction manifold for an internal-combustion engine, comprising an elongate main body having longitudinal inner cavity provided with an opening adapted to communicate with the intake orifices of the engine, an inlet duct provided with an air-inlet opening and communicating with the cavity, a feed duct for EGR gases formed integrally with the manifold and comprising a first portion extending inside the main body from an inlet orifice for EGR gases to the air-inlet duct and from a second portion extending inside the inlet duct and provided with an outlet opening in the inlet duct itself, and a baffle disposed in the inlet duct between the air-inlet opening and the outlet opening of the feed duct for directing the air and the EGR gases towards a mixing zone inside the inlet duct and situated at a predetermined distance from the cavity of the main body.

U.S. Pat. No. 2001/0027784 A1 issued to Schmid et al discloses a mixing device is provided for an exhaust gas recirculation system of an internal combustion engine with an intake air line and an exhaust gas recirculation line. The outlet opening of the recirculation line or admission opening of the intake air line opens into the intake air line and a swirl generating element and/or a turbulence generating element is provided in the area of the admission opening of the mixing device.

U.S. Pat. No. 2001/0042372 A1 issued to Khair discloses a filtration system adapted to prevent diesel soot carried with recirculated exhaust gas from being recirclated through internal combustion engine. The filtration system provides continuous elimination of soot, thus reducing its negative impact on engine life, lubrication oil quality, and on components in the exhaust gas recirculation system. The filtration system comprises a non-thermal plasma generator that periodically, or continuously, oxidizes carbon deposited, or trapped, within a carbon filter disposed downstream of the non-thermal plasma generator.

U.S. Pat. No. 2001/0045090 A1 issued to Gray, JR. discloses a diesel-cycle engine with a unique exhaust gas recirculation system includes a plurality of cylinders with fuel feed for each of the cylinders and an intake manifold for distributing intake air to each of the cylinders for combustion of the fuel charges therein with generation of exhaust gas. The exhaust gas is discharged to ambient atmosphere through an exhaust line with a gas turbine therein. The gas turbine drives an intake compressor which serves to compress the intake air. An engine controller controls a valve regulating the amount of exhaust gas recirculation responsive to sensed concentration of an exhaust gas component. In another embodiment, an engine controller controls a valve regulating the amount of exhaust gas recirculation, responsive to sensed demand for torque and control of fuel injection quantity is responsive to sensed concentration of an exhaust gas component. An exhaust gas recirculation line recirculates a portion of the collected exhaust gas to the combustion chambers through an exhaust gas cooler which serves to cool the gas and separate out a condensate and particulate matter. A return line leading from the exhaust gas cooler to the exhaust line serves to discharge the separated condensate and particulate matter through the exhaust line to the ambient atmosphere.

BRIEF SUMMARY OF THE INVENTION

The invention comprises an exhaust gas recirculation method and system for reducing $NO_x$ emissions from engines. This is accomplished by passing an exhaust gas stream that comprises suspended particles, oxygen, nitrogen, carbon dioxide, water vapor molecules in addition to other gaseous species next to a clean air engine intake stream containing nitrogen and oxygen molecules. Particulate matter in the exhaust stream is separated by molecular diffusion by exposing the two streams to each other and allowing molecular transfer to occur between the two streams, until near gas phase equilibrium is achieved so that little or no particle transfer between the two streams takes place due to their slow diffusion relative to gas phase species to replace some of the oxygen present in the intake air stream with $CO_2$ and $H_2O$ molecules from the exhaust. The molecular diffusion is accomplished by a perforated surface or a mesh screen to provide the molecular diffusion.

An object of the invention is to reduce $NO_x$ emissions from engines. Another object of the invention is to recirculate a portion of the exhaust gas to the intake air system of an engine to enrich the intake air with inert constituents such as $CO_2$ and $H_2O$ molecules. Another object of the invention is to reduce the level of oxygen entering the combustion process. Another objects of the invention is to decrease the peak and average temperatures inside the combustion chamber of an engine, and thus reduce $NO_x$, emissions.

Other objects of the invention are shown in the following detailed description and claims.

DETAILED DESCRIPTION OF THE INVENTION

Figure 1:
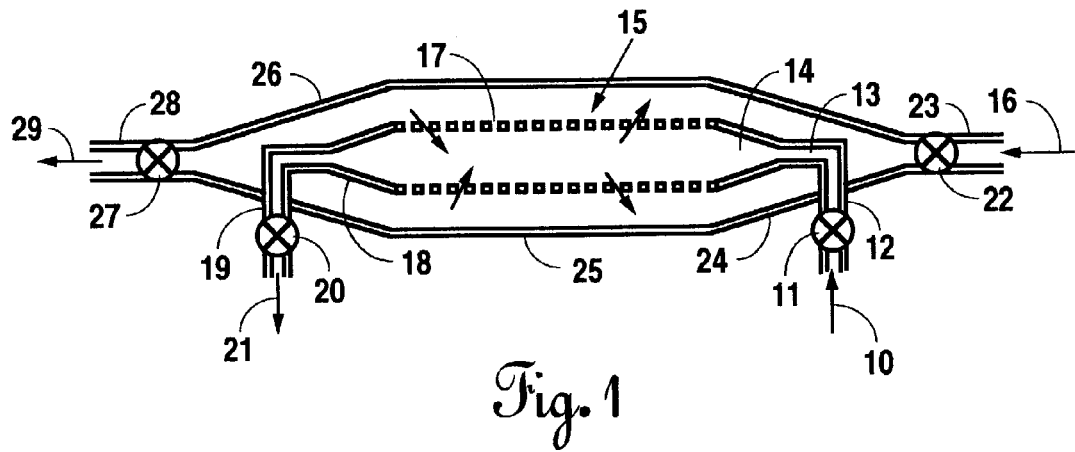
FIG. 1 is a schematic view a particle-free EGR element.

The invention comprises a method and system to achieve essentially particle-free EGR by molecular diffusion. The design concept is illustrated in FIG. 1. In principle an exhaust gas stream 10 that comprises suspended particles, oxygen, nitrogen, carbon dioxide, water vapor molecules in addition to other gaseous species in the exhaust gas is passed through a control valve 11 in conduit 12. The conduit 12 connects to a conduit 13 and a connector 14. The connector 14 connects to a molecular diffusion means 15 which allows the exhaust gas to pass next to a clean air stream 16 containing nitrogen and oxygen molecules, like engine intake air, but separated from the exhaust stream by a perforated surface or a mesh screen 17. The perforated surface or a mesh screen 17 connects to a connector 18 which is in turn connected to the conduit 18 with valve 20. The engine exhaust out 21 contains suspended particles, including $N_2$, reduced concentration of $CO_2$, $H_2O$ and other gaseous species contained in the exhaust gas and increased concentration of $O_2$.

Diesel exhaust contains high levels of fine soot, known as small particulate matter, or SPM. Much of the SPM are particles less than 0.5 microns in diameter. Ninety percent of particles emitted by diesel vehicles are less than 0.1 micron in diameter.

A type of preferred material of construction for the screen is a heat- and oxidation-resistant metal, such as a stainless steel or the like. The cylindrical-shaped body of the screen may have a plurality of fine, parallel gas flow passages extending therethrough. The sheets and corrugations are sized to provide the desired number of gas flow passages, which may range, typically, from about 50 holes per cm$^2$ (about 3,000 holes per square inch). Various coatings may also be used to protect the screen and keep it from clogging.

The mesh screen may be perforated metal with the perforations sized to provide sufficient diffusion without passage of the SPM. Multiple screens may be used in series or parallel to provide sufficient molecular diffusion. The screen 17 could also comprise multi-layers of perforated flat surfaces, or screen meshes to provide enough flow. The perforations are small enough to keep out the particles and still allow sufficient diffusion. It is important that the separation area connecting the two streams provides sufficient surface area so that the surface area for the molecular diffusion to take place is maintained at an adequate level. The particles in the exhaust may be less than one micrometer so they are relatively small. The incoming air is not passed directly into the exhaust partly because of the exposure of the two streams to each other and the momentum of the two stream goings through at opposite directions.

The method of transfer between the two streams is diffusion and there should be no particle cross over. There should be a rapid diffusion because molecular diffusion is faster than particle diffusion. The intake would be going in one direction and the exhaust would be going the other direction to minimize cross-flow. The time of contact between the intake air and the exhaust flow would be of sufficient time in order to allow molecular transfer to take place, but not long enough for particle transfer to take place. The incoming air would actually be relatively slow moving air compared to the relatively fast moving exhaust so the exhaust is almost always flushing out the system. This might allow diffusion of as much as 50% of the gas flowing into the engine. Again one can adjusting the bow valves you can determine what velocity is flowing through the intake and exhaust. The exhaust temperature may be as high as 450 degrees C. so the screen material should be able to handle a temperature range of about 200 degrees C. to 900 degrees C.

The flow of oxygen into the combustion chamber is reduced because some of it is displaced by the CO2 and H2O from the exhaust. This should reduce the $NO_x$ emissions to help meet government standards.

The clean ambient air stream containing $O_2$ and $N_2$, 16 passes through valve 22 in conduit 23. The conduit 23 connects to connector portion 24 to continue the passage of the air stream 16. The connector portion 24 connects to conduit 25. The conduit 25 surrounds the perforated surface or a mesh screen 17 and connects to the connector 26. The connector conduit 26 connects to the conduit 28 and the particle-free recovered exhaust gas and intake air 29 pass though the valve 27. The particle-free recovered exhaust gas and intake air 29, including $N_2$, reduced concentration of $O_2$, increased concentration of $CO_2$, $H_2O$ and other gaseous species from the exhaust gas are then directed to the intake of an internal combustion engine.

Valves 11, 20, 22 and 27 are preferably bow valves to tune the flows within the system. By adjusting the valves, optimum performance can be obtained.

By exposing the two streams 10 and 16 to each other, molecular transfer by molecular diffusion occurs between the two streams, via the perforated surface or mesh screen 17, until near gas phase equilibrium is achieved. Little or no particle transfer between the two streams 10 and 16 takes place due to their slow diffusion relative to gas phase species. Equilibrium means that every gas phase species will become equally present in the two streams at the exit location 21 and 29 of each stream. The desire is to replace some of the oxygen present in the intake air stream 16 with $CO_2$ and $H_2O$ molecules from the exhaust stream 10 thus reducing the oxygen content of the air intended to be used as EGR.

Figure 2:
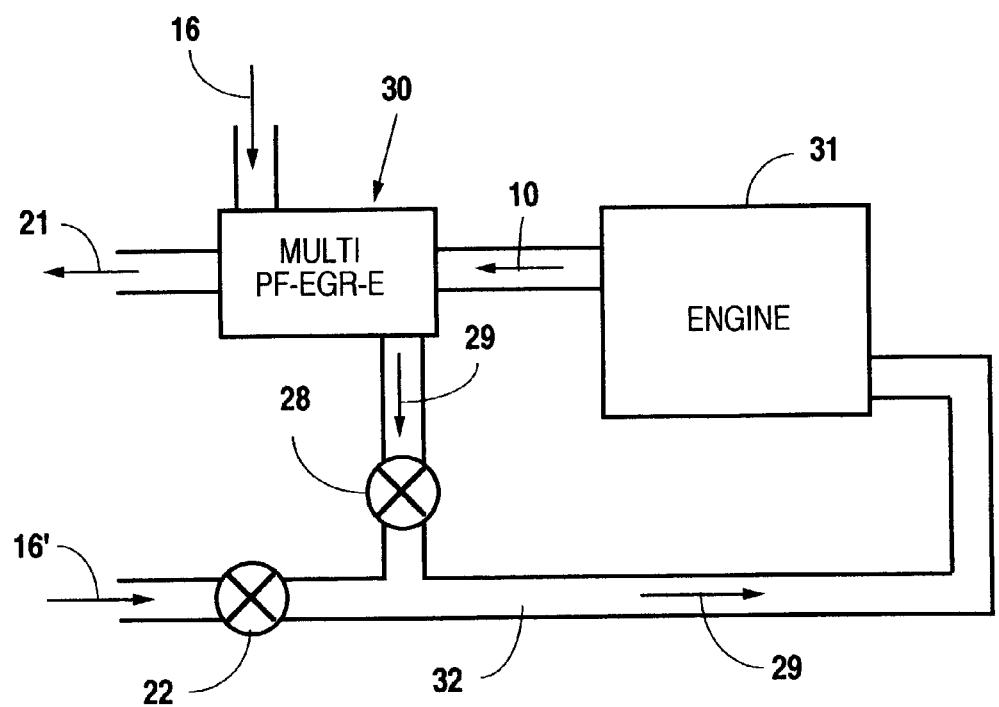
FIG. 2 is a schematic view of an embodiment of the invention.

An example of how such system may be used on an engine is shown in FIG. 2. The intake air stream 16 passes though the exhaust gas recovery means 30 where it comes in contact with the exhaust gas 10 from the engine 31. Molecular transfer by molecular diffusion occurs between the two streams, via the perforated surface or mesh screen 17, until near gas phase equilibrium is achieved. The resulting gas stream 29 passes through valve 28 and into conduit 32 that is connected to the engine 31.

I claim:

1. A method for exhaust gas recirculation system for reducing $NO_x$ emissions from engines, comprising the steps of:

recirculating a portion of the exhaust gas by molecular diffusion to the intake air system of an engine to enrich the intake air with inert constituents such as $CO_2$ and $H_2O$ molecules and reducing the level of oxygen entering the combustion process; and adding the portion of the exhaust by molecular diffusion to the intake air while retaining all particles suspended in the exhaust system to avoid intake air system fouling, lube oil contamination, degrading turbocharger and aftercooler performance, and premature piston ring and liner failure, relying on the slow particle diffusion in the intake air compared to exhaust gases.

2. The method of claim 1 and further comprising the step of:

decreasing the peak and average temperatures inside the combustion chamber of the engine to reduce $NO_x$ emissions.

3. The method of claim 1 wherein the step of separating by molecular diffusion is accomplished by a perforated surface or a mesh screen to provide the molecular diffusion.

4. The system of claim 1 wherein the said means for separating particulate matter by molecular diffusion includes a perforated surface or a mesh screen to provide the molecular diffusion.

5. A method for exhaust gas recirculation system for reducing $NO_x$ emissions from engines, comprising the steps of:

passing an exhaust gas stream that comprises suspended particles, oxygen, nitrogen, carbon dioxide, water vapor molecules in addition to other gaseous species next to a clean air engine intake stream containing nitrogen and oxygen molecules:

separating particulate matter in the exhaust stream by molecular diffusion by exposing the two streams to each other and allowing molecular transfer to occur between the two streams, until near gas phase equilibrium is achieved so that little or no particle transfer between the two streams takes place due to their slow diffusion relative to gas phase species to replace some of the oxygen present in the intake air stream with $CO_2$ and $H_2O$ molecules from the exhaust.

6. An exhaust gas recirculation system for reducing $NO_x$ emissions from engines, comprising:

means for passing an exhaust gas stream that comprises suspended particles, oxygen, nitrogen, carbon dioxide, water vapor molecules in addition to other gaseous species next to a clean air engine intake stream containing nitrogen and oxygen molecules:

means for separating particulate matter in the exhaust stream by molecular diffusion by exposing the two streams to each other and allowing molecular transfer to occur between the two streams, until near gas phase equilibrium is achieved so that little or no particle transfer between the two streams takes place due to their slow diffusion relative to gas phase species to replace some of the oxygen present in the intake air stream with $CO_2$ and $H_2O$ molecules from the exhaust.

7. The exhaust gas regeneration system for reducing $NO_x$ emissions from engines, as recited in claim 6, wherein said means for separating includes multiple perforated surfaces or mesh screens of either multiple flat layers or multiple tubes.

* * * * *